United States Patent [19]

Becker et al.

[11] 4,232,704
[45] Nov. 11, 1980

[54] IN LINE BACK FLOW PREVENTER

[75] Inventors: Bernard S. Becker, Belmont; John K. Bowman, Brighton; Cyril A. Randall, Belmont, all of Mass.

[73] Assignee: Amtrol Inc., West Warwick, R.I.

[21] Appl. No.: 890,964

[22] Filed: Mar. 28, 1978

[51] Int. Cl.³ .................... F16K 15/06; F16K 45/00
[52] U.S. Cl. ................................. 137/218; 137/512; 137/541
[58] Field of Search ............... 137/215, 217, 218, 362, 137/116, 512, 512.3, 541, 527.2, 527.8

[56] References Cited

U.S. PATENT DOCUMENTS

| | | | |
|---|---|---|---|
| 2,389,413 | 11/1945 | Carlton | 137/215 X |
| 2,503,424 | 4/1950 | Snyder | 137/116 |
| 2,706,488 | 4/1955 | Harrington | 137/215 X |
| 3,448,763 | 6/1969 | Curtiss | 137/503 X |
| 3,636,968 | 1/1972 | Tine | 137/102 |
| 3,747,621 | 7/1973 | Tine | 137/218 |
| 4,054,153 | 10/1977 | Guyton | 137/527.8 X |
| 4,090,527 | 5/1978 | Sutherland | 137/218 X |
| 4,129,144 | 12/1978 | Andersson | 137/541 |

Primary Examiner—William R. Cline
Attorney, Agent, or Firm—Fisher, Christen & Sabol

[57] ABSTRACT

A back flow preventing device which prevents the reverse flow of water from a point of use into a water supply system. The device has a casting with coaxially aligned inlet and outlet openings, and containing coaxially aligned inlet and outlet check valves. The coaxial alignment of the inlet and outlet openings, and of the inlet and outlet check valves serves to minimize the pressure drop through the device. Between the inlet and outlet check valves is a diaphragm actuated relief valve which opens to drain the passage between the check valves if they should malfunction or if there is a drop in the supply line pressure sufficient to cause actual or potential reverse flow back toward the supply line.

17 Claims, 7 Drawing Figures

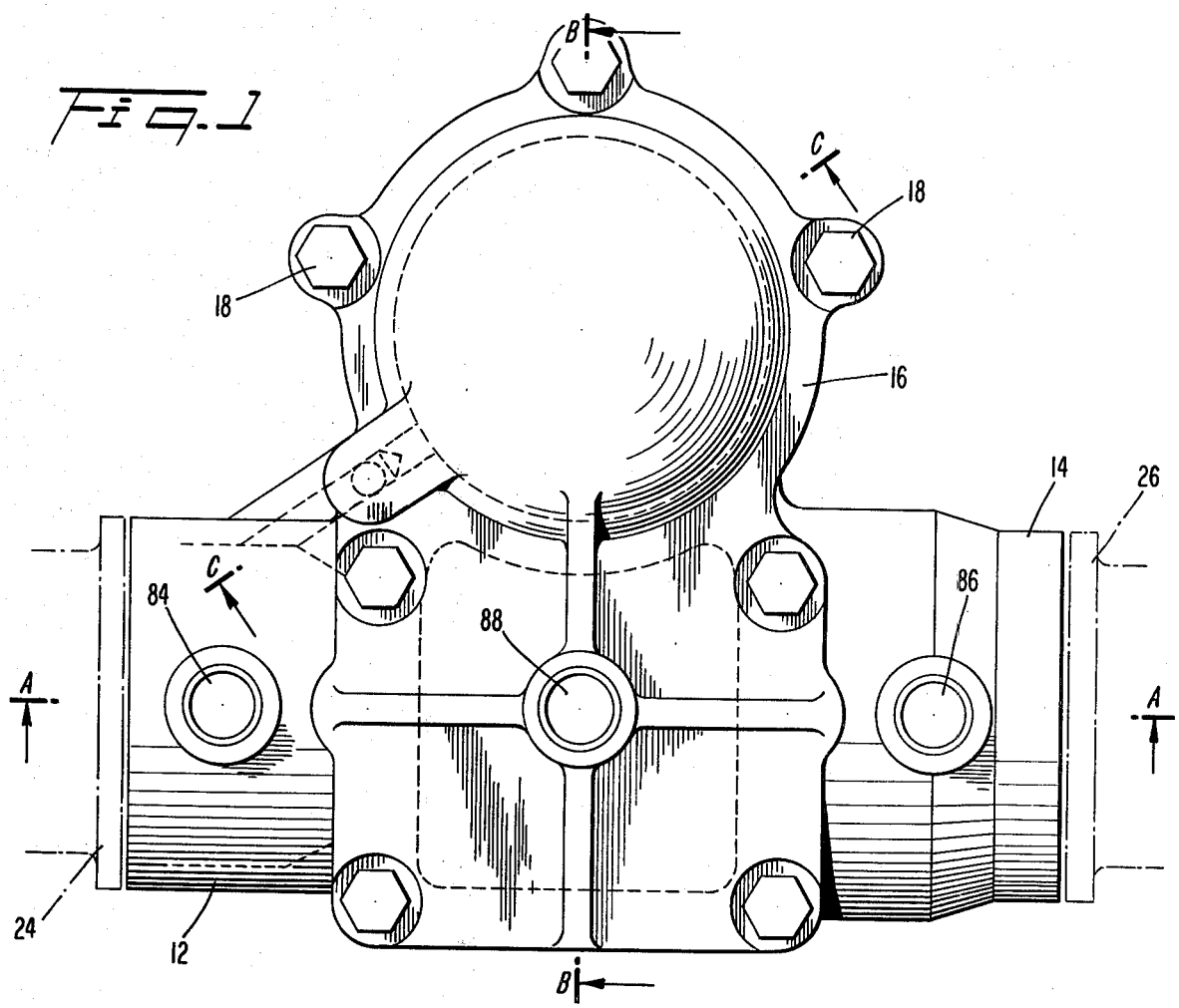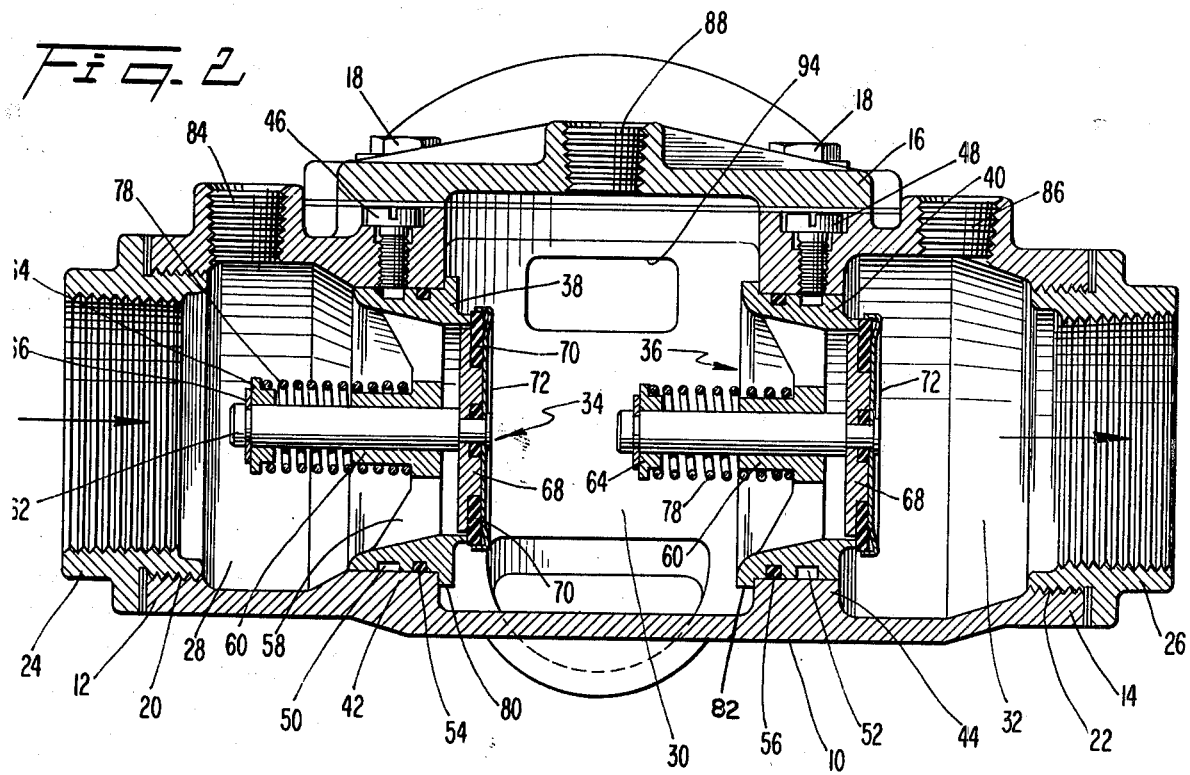

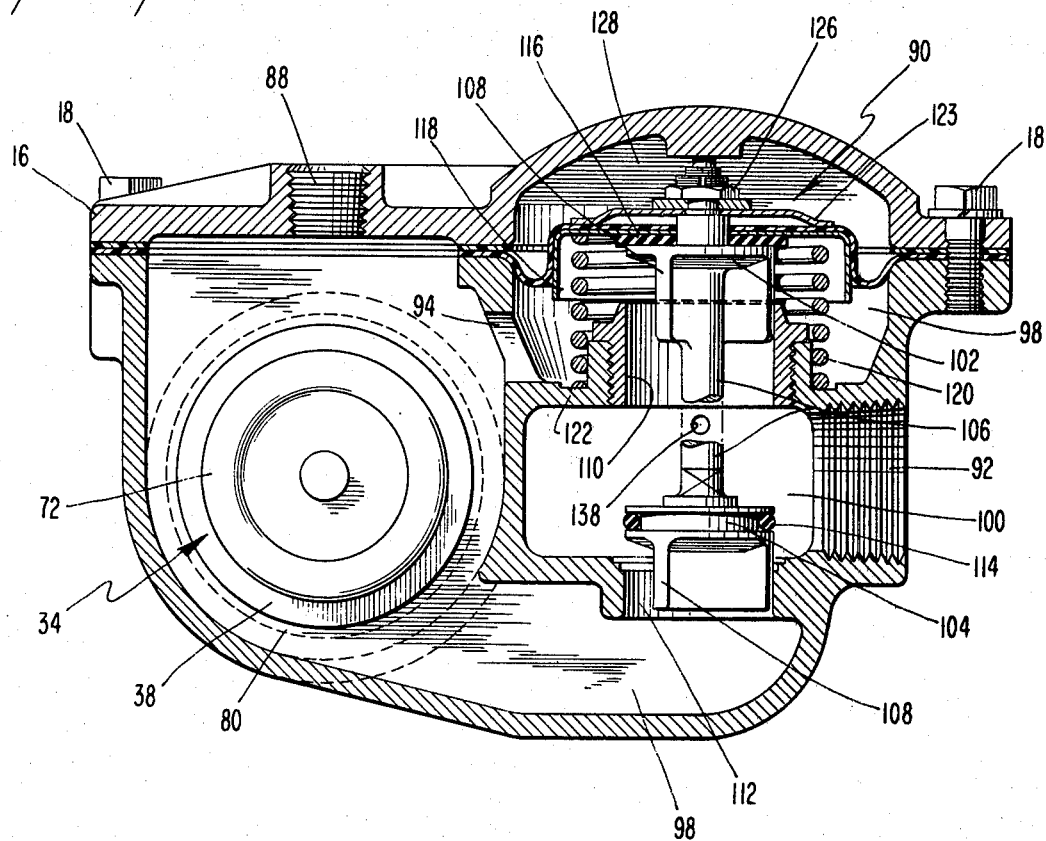
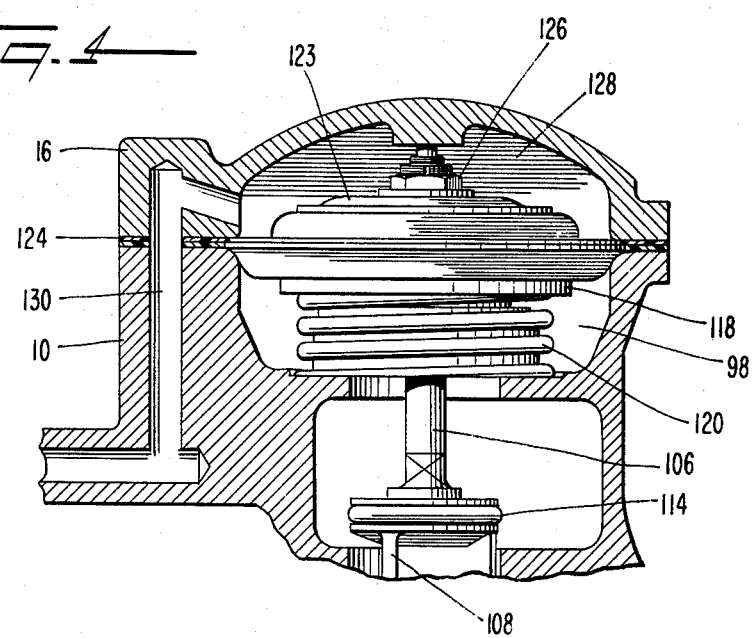

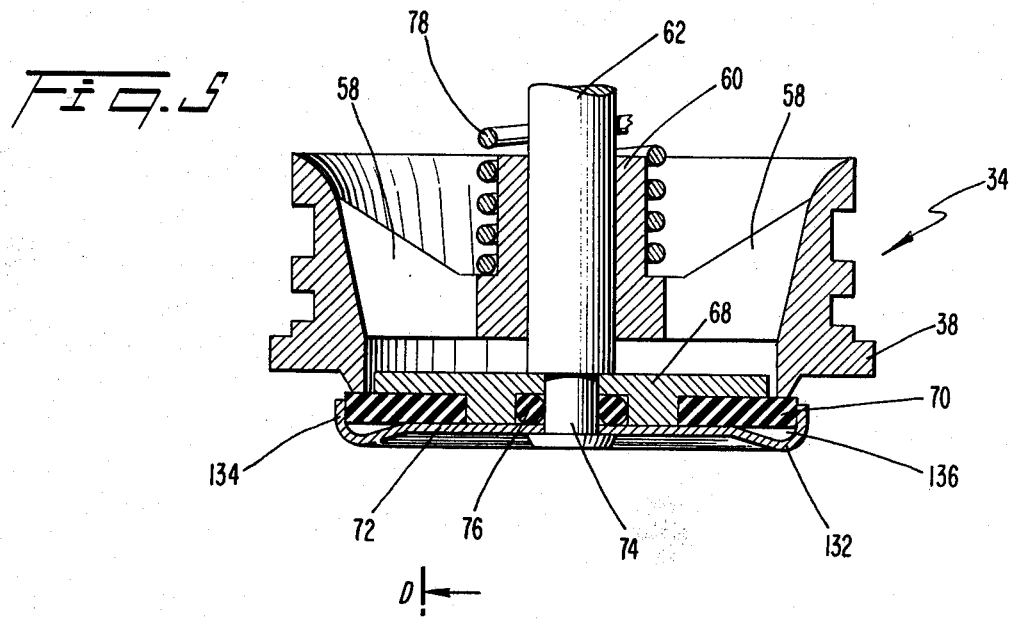
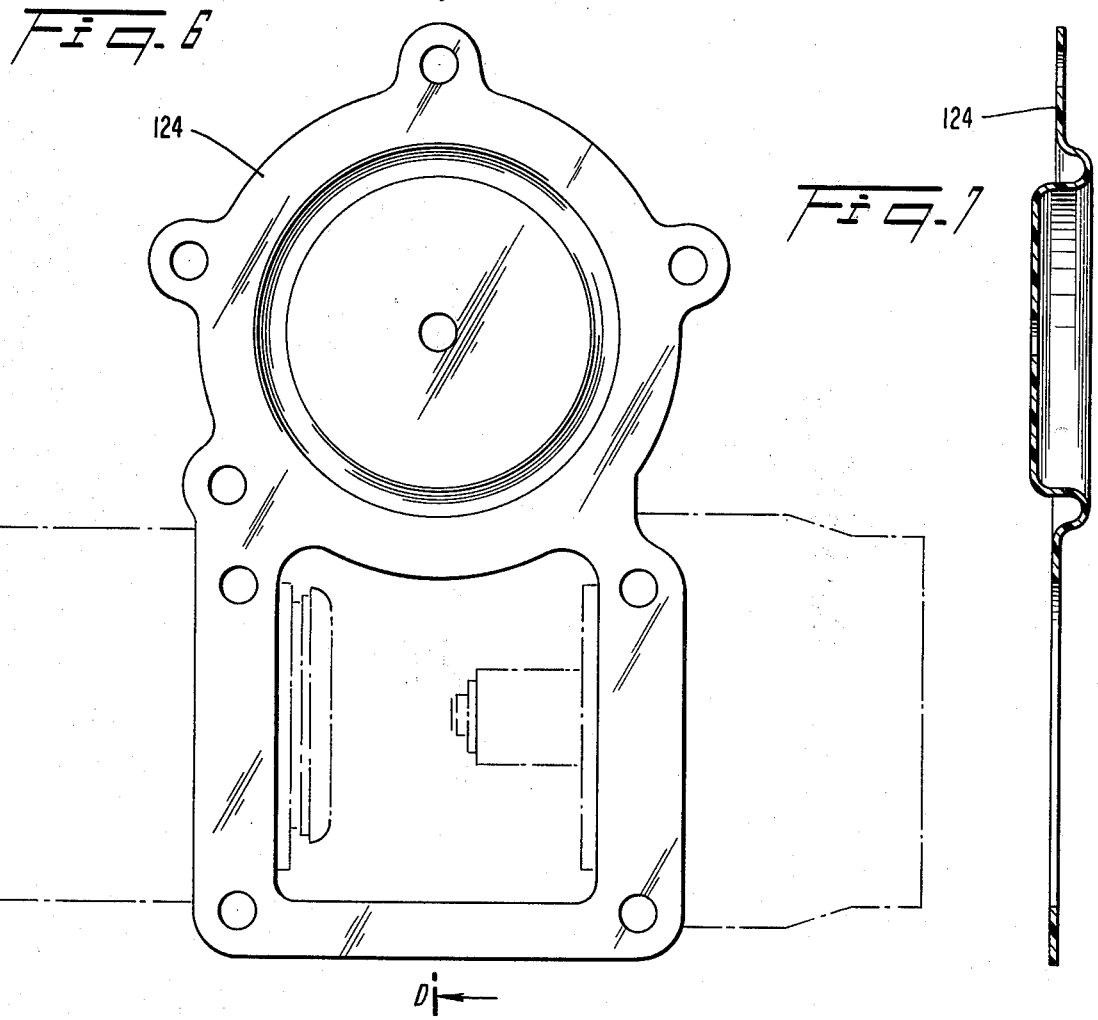

IN LINE BACK FLOW PREVENTER

FIELD OF THE INVENTION

This invention relates to in-line back flow preventing devices.

BACKGROUND OF THE INVENTION

Back flow preventers are required equipment in all potable water supply lines where there is any possibility of reverse flow back into the supply line due to changing pressures in the supply and outlet lines.

Back flow preventers now in use generally include two check valves arranged in series so that water under sufficient pressure on the supply side will cause the valves to open and allow water to flow freely to the outlet pipes. It is also customary practice to include in the passage between the check valves, a relief valve which will automatically open should there be any flow in the reverse direction due to a drop in the supply line pressure and failure of one or both check valves to hold against higher outlet pressure. With the relief valve open, any contaminated or polluted water passing the downstream check valve in the reverse direction will be drained to atmosphere and thereby be prevented from entering the supply line.

The following U.S. Pat. Nos. are illustrative of the present state of the art: Carlton 2,389,413; Snyder 2,503,424; Curtiss 3,448,763; Tine 3,636,968; Tine 3,747,621.

SUMMARY OF THE INVENTION

This invention is an improvement over the prior art devices insofar as it provides a back flow preventer which minimizes the pressure drop between the inlet and outlet, thereby permitting a higher flow capacity for a given valve size.

At the same time it provides a more simple construction which renders regular maintenance easier and increases the period of use before any malfunctions occur. The pressure loss through the back flow preventer is minimized by providing a straight through flow path instead of the tortuous flow path of previous back flow preventers. The device has coaxially aligned inlet and outlet openings and a straight through flow path with a pair of check valves located in the flow path. Both check valves open in the direction of the fluid flow and are spring biased to a normally closed position. The casing of the in-line back flow preventer has a removable top portion which, when removed, allows both check valve assemblies to be removed for maintenance and inspection without removing the casing from the water line and without disturbing the relief valve assembly. The respective valve assemblies are constructed so as to prevent incorrect installation in the casing.

Should one or both of the check valves malfunction, a relief valve assembly is provided between the check valves to vent any water to atmosphere rather than allowing it to enter the water supply line. The relief valve is connected to, and actuated by a flexible diaphragm. The diaphragm, in turn, operates on the pressure differential between the inlet supply pressure and the pressure in the interior of the casing such that when the pressure differential goes below a predetermined point, indicating a potential back flow situation, the diaphragm opens the relief valve, thereby preventing water from entering the supply line.

BRIEF DESCRIPTION OF THE DRAWINGS

In the drawings

FIG. 1 is a top view of the back flow preventer according to this invention.

FIG. 2 is a longitudinal sectional view of the back flow preventer of FIG. 1 taken along lines A—A.

FIG. 3 is a transverse sectional view of the back flow preventer of FIG. 1 taken along lines B—B.

FIG. 4 is a partial sectional view of the back flow preventer of FIG. 1 taken along lines C—C.

FIG. 5 is a detailed view, partially in section of one of the check valves in FIG. 2.

FIG. 6 is a top view of the diaphragm gasket used in the back flow preventer according to this invention.

FIG. 7 is a cross-sectional view of the diaphragm gasket of FIG. 6 taken along lines D—D.

DETAILED DESCRIPTION OF THE PREFERRED EMBODIMENT

The back flow preventer according to this invention comprises casing 10 having inlet 12 and outlet 14, and cover 16. Cover 16 is removably retained on casing 10 by bolts 18. Inlet 12 and outlet 14 are internally threaded as at 20 and 22, respectively, for engagement with inlet and outlet adaptors, 24 and 26. Adaptors 24 and 26 may be screwed into inlet 12 and outlet 14 to facilitate connecting the casing to appropriate diameter inlet and outlet pipes (not shown). The exact size of adaptors 24 and 26 will, of course, depend on the particular installation in which the back flow preventer is used.

The interior of casing 10 defines inlet chamber 28, central chamber 30, and outlet chamber 32. Inlet chamber 28 is separated from central chamber 30 by check valve assembly 34, while central chamber 30 is separated from outlet chamber 32 by check valve assembly 36. As can be seen in FIG. 1 and 2, the three chambers are coaxially aligned and, when check valve assemblies 34 and 36 are open, form a straight through flow path for the water. The elimination of the tortuous flow path of the prior art back flow preventers serves to minimize the pressure drop between the inlet and outlet, and permits a higher flow capacity for a given valve size. Obviously, this allows a higher outlet pressure to be maintained for a given inlet pressure.

Valve seats 38 and 40 are removably retained on lands 42 and 44, respectively, by the engagement of the ends of retaining screws 46 and 48 with peripheral grooves 50 and 52. "O" rings 54 and 56 provide the requisite water tight sealing between the peripheries of valve seats 38 and 40, and lands 42 and 44.

Valve seat 38 has a plurality of circumferentially spaced radially inwardly protruding legs 58 which support valve guide member 60. Any number of circumferentially spaced legs 58 may be used as long as the fluid flow through the valve seat is not unduly restricted.

Valve guide member 60 slidably supports valve stem 62 having spring retainer 64 attached to one end by retaining ring 66. Although a retaining ring engaging a peripheral groove is shown, any other means to keep spring retainer 64 from sliding off the end of valve stem 62 may be used without exceeding the scope of this invention. On the opposite end of valve stem 62 is mounted disc 68, valve member 70 and backing plate 72. Valve member 70 is made of hard rubber or similar flexible material which will effectively stop the fluid flow when brought into engagement with valve seat 38.

Disc 68, valve member 70 and backing plate 72 are rigidly attached to a reduced end portion 74 of valve stem 62 by deforming such end portion which protrudes beyond backing plate 72, as best shown in FIG. 5. Alternatively, reduced end portion 74 may be externally threaded and a nut used to hold disc 68, valve member 70 and backing plate 72 thereon.

Obviously, any other means may be used to hold the aforementioned parts in assembled relationship without exceeding the scope of this invention. "O" ring 76 is placed around reduced portion 74 in a recess in disc 68 to prevent fluid leakage through the assembly valve. Compression spring 78 is interposed between spring retainer 64 and valve guide 60, as shown in FIG. 2, so as to normally bias valve member 70 against valve seat 38.

Valve assembly 36 is similar both in construction and operation to valve assembly 34 and, therefore, no detailed discussion is believed to be necessary. The only difference between valve assemblies 34 and 36 lies in their diameters and in the radially outwardly protruding flanges on valve seats 38 and 40. Flange 80 is located on the outer periphery of valve seat 38 nearest the valve assembly 34, as best seen in FIG. 2, while flange 82 is located on the opposite side of valve seat 40. Flanges 80 and 82 prevent the valve assemblies from being installed backwards, while at the same time serving to align the peripheral grooves on valve seats 38 and 40 with their respective retaining screws 46 and 48. The flanges also facilitate removal of valve assemblies 34 and 36 as a screw driver or similar tool may be used to pry on the back edge of each flange to start the valve seats out of lands 42 and 44.

Inadvertent assembly of check valve assembly 34 in place of check valve assembly 36 or vice versa is prevented by making the external diameter of valve seats 38 different from that of valve seat 40. Thus, either valve seat 38 or 40 would simply not fit into the opening intended for the other seat.

Casing 10 has internally threaded openings 84 and 86 therethrough, which openings communicate with chambers 28 and 32, respectively.

A similar internally threaded opening 88 is provided in cover 16 to communicate with central chamber 30. These threaded openings may be connected to pressure gauges (not shown) or other pressure indicators or recorders to provide a visual indication of the water pressure in each chamber. If such visual indications are not desired, openings 84, 86 and 88 may be sealed by installing externally threaded plugs or stop cocks.

In the normal operating mode, check valve assemblies 34 and 36 are closed preventing any passage of water through the device. Normal water pressure in the supply line connected to inlet 12 is sufficient to overcome the force of the check valve springs and cause check valves 34 and 36 to open, thereby allowing water to flow to the outlet pipe (not shown). There will, of course, be a pressure drop as the water passes through check valves 34 and 36, but it will be minimized due to the straight-through nature of the flow path through the device.

Should the downstream pressure build up, while the inlet pressure remains relatively constant, the pressure differential across the check valves becomes smaller thereby allowing the check valve springs to close the check valves to prevent back flow through the device.

If the two check valve assemblies 34 and 36 worked perfectly, the aforedescribed device would serve to prevent back flow under any and all conditions. However, even a mechanism as simple and reliable as a check valve is subject to malfunctions (such as jamming open, foreign matter caught between the valve and valve seat, catastrophic failure of valve stem, etc.) which would render the aforedescribed device inoperative. It is of the utmost importance to prevent any possibility of malfunction since the water supply could be contaminated endangering other users of the water system.

The present device is rendered fail-safe by the inclusion of a diaphragm actuated relief valve connected between chamber 30 and a drain vent. As best seen in FIG. 3, relief valve assembly 90 is located in casing 10 displaced laterally from the axis of inlet 12 and outlet 14, and controls fluid flow out of drain vent 92. Chamber 30 communicates with valve assembly 90 via passages 94 and 96.

Relief valve assembly 90 comprises valve elements 102 and 104 interconnected by valve stem 106. Each of the valve elements 102 and 104 has a plurality of depending legs 108 which slidably bear against the sides of valve seat 110 and opening 112 to maintain the elements in coaxial alignment therewith during movement of the valve assembly "O" ring 114 is provided in a peripheral groove in valve element 104 to provide the requisite sealing when element 104 is closed. Valve element 102 comprises valve disc 116 made of hard flexible material, such as rubber, and diaphragm piston 118. Valve disc 116 bears against valve seat 110, which is threadingly attached to casing 10, to shut off the fluid flow between chamber 98 and chamber 100. Compression spring 120 bears against inner casing wall 122 and diaphragm piston 118 to normally bias relief valve assembly 90 in an open position. Relief valve assembly 90 may be attached to diaphragm 124 via nut 126 threaded onto a portion of valve stem 106 which extends through an opening in the diaphragm and backing plate 123.

Diaphragm 124 is made integrally with the gasket, as shown in FIGS. 6 and 7, which fits between casing 10 and cover 16, and prevents communication between chamber 98 and chamber 128. Chamber 128 is at the inlet pressure since it communicates with inlet chamber 28 via passage 130 in casing 10, shown in detail in FIG. 4. Chamber 98 is at relatively the same pressure as chamber 30 since it communicates therewith via passage 94. The force generated by the pressure differential between chamber 128 and 98 (caused by the pressure drop across check valve assembly 34) is great enough to overcome the force of spring 120 and maintain valve elements 102 and 104 in a closed position under normal operating conditions. Thus, in normal operation, no water passes out drain vent 92. However, when a downstream pressure build-up occurs, (assuming a malfunction of either of the check valves so that they fail to close as previously described) and the pressure differential between chambers 28 and 30 (and consequently between chambers 128 and 98) drops below a predetermined point, spring 120 causes relief valve assembly 90 to open. Once the relief valve opens, the water passes out drain vent 92 rather than back into the supply line thus avoiding contamination of the water supply. Drain vent 92 may be connected to a drain pipe (not shown) to direct the water away from the location of the back flow preventer.

Vent hole 138 is provided through the wall of casing 10 and allows communication between chamber 100 and atmosphere. Thus, if the air gap required by the plumbing code in the drain pipe (not shown) connected to drain vent 92 should inadvertently become clogged, vent hole 138 acts as a secondary air gap to prevent development of negative pressure in chamber 100. Also, if the drain pipe should become clogged, the water flowing out of vent hole 138 would give a warning of this condition.

Although relief valve assembly 90 provides adequate protection should the check valve assemblies malfunction, this invention also provides means to minimize the chances of such a malfunction occurring. As shown in FIG. 5, backing plate 72 contains a recessed annular portion 132 adjacent to its periphery.

If valve stem 62 and valve guide 60 should become worn enough to enable valve stem 62 to become skewed with respect to valve guide 60, recessed portion 132 allows one side of valve member 70 to deflect so as to ensure the seating of valve member 70 on the entire circumference of valve seat 38. Backing plate 72 has peripheral flange 134 spaced from the periphery of valve element 70 so as to allow water to pass into annular space 136 defined by recessed portion 132. The build-up of downstream water pressure, which cause the check valve to close, will assist in the seating of valve element 70 against valve seat 38 due to the water entering annular space 136 and acting against flexible valve member 70. A similarly shaped backing plate is used on check valve assembly 36. The foregoing description of the preferred embodiment is to be construed as illustrative and not in any way limiting.

We claim:

1. A device for preventing the back flow of water from a point of use into a water supply line comprising:
   (a) a unitary casing having a water inlet opening, a water outlet opening, a drain vent inlet opening, and a removal opening, said water inlet and water outlet openings being coaxially aligned, the interior of said casing defining an inlet chamber, a central chamber, an outlet chamber, a first communicating passage between the inlet chamber and the central chamber and a second communicating passage between the central chamber and the outlet chamber, said chambers being coaxially aligned with each other and with said water inlet and water outlet openings to form a straight through flow path for the water, said interior of said casing also defining a drain vent chamber communicating with said drain vent opening and said central chamber, said drain vent chamber being offset from said coaxially aligned inlet, central and outlet chambers, said removal opening directly communicating with said central chamber;
   (b) a first check valve assembly detachably mounted in said first communicating passage at the central chamber end thereof, in a manner which, after detachment of said first check valve assembly, allows removal of said first check valve assembly from said casing only via said central chamber, said first check valve being biased in a closed position to prevent the flow of water therethrough and opening to permit the flow of water therethrough when the water pressure in the water inlet chamber exceeds a predetermined level, said first check valve being coaxially aligned with said water inlet and outlet openings and said inlet, central and outlet chambers;
   (c) a second check valve assembly detachably mounted in said second communicating passage at the central chamber end thereof, in a manner which, after detachment of said second check valve assembly, allows removal of said second check valve assembly from said casing only via said central chamber, said second check valve being biased in a closed position to prevent flow of water therethrough when the water pressure in said central chamber exceeds a predetermined level, said second check valve being coaxially aligned with said water inlet and outlet openings and said inlet, central and outlet chambers;
   (d) a relief valve located within said casing interposed between said central chamber and said drain vent chamber, said relief valve being biased in an open position, said relief valve being offset from said coaxially aligned inlet, central and outlet chambers;
   (e) a flexible diaphragm attached to said casing and to said relief valve, one side of said diaphragm communicating with said central chamber and with said drain vent opening, said central chamber communicating with said drain vent opening by a communicating route, including a valve seat passage, through said relief valve, the other side of said diaphragm communicating with said inlet chamber, said relief valve having an element which closes said valve seat passage when there is a pressure differential between said inlet and central chambers caused by flow of water from said inlet chamber into said central chamber through said first communicating passage, thereby preventing water flow from said central chamber to said drain vent chamber, said valve seat passage being open when said pressure differential is not present; and
   (f) a cover removably attached to said casing over said removal opening therein, said first and second check valve assemblies being removable from said central chamber without removal of said flexible diaphragm when said cover is detached.

2. The back flow preventing device as claimed in claim 1 wherein said first check valve assembly comprises:
   (a) a first valve seat;
   (b) means to removably attach said first valve seat to said casing;
   (c) a first valve member movable between an open position wherein said first valve member is displaced away from said first valve seat and a closed position wherein said first valve member is in contact with said first valve seat; and
   (d) first biasing means to bias said first valve member to a normally closed position.

3. The back flow preventing device as claimed in claim 2 wherein said first biasing means comprises a compression spring.

4. The back flow preventing device as claimed in claim 2 wherein said first valve seat has a groove about its periphery in its portion located in said first communicating passage and said means to attach said first valve seat to said casing comprises a first retaining screw threadingly engaging said casing, the end of said first retaining screw extending into said peripheral groove.

5. The back flow preventing device as claimed in claim 2 wherein said first valve member comprises:
   (a) a first valve stem slidably attached to said first valve seat;
   (b) a first valve element of flexible material attached to an end of said first valve stem, said first valve element contacting said first valve seat when said first valve member is in a closed position; and (c) a first backing plate attached to said end of said first valve stem, said first backing plate having a recessed portion adjacent to its periphery to allow deflection of said first valve element so as to ensure seating of said element against said first valve seat even if said first valve stem should become skewed with respect to said first valve seat.

6. The back flow preventing device as claimed in claim 1 wherein said second check valve assembly comprises:
   (a) a second valve seat;
   (b) means to removably attach said second valve seat to said casing;
   (c) a second valve member movable between an open position wherein said second valve member is displaced away from said second valve seat and a closed position wherein said second valve member is in contact with said second vale seat; and
   (d) second biasing means to bias said second valve member to a normally closed position.

7. The back flow preventing device as claimed in claim 6 wherein said second biasing means comprises a compression spring.

8. The back flow preventing device as claimed in claim 6 wherein said second valve seat has a groove about its periphery in its portion located in said second communicating passage and said means to attach said second valve seat to said casing comprises a second retaining screw threadingly engaging said casing, the end of said second screw extending into said peripheral groove.

9. The back flow preventing device as claimed in claim 6 wherein said second valve member comprises:
   (a) a second valve stem slidably attached to said second valve seat;
   (b) a second valve element of flexible material attached to an end of said second valve stem, said second valve element contactng said second valve seat when said second valve member is in the closed position; and
   (c) a second backing plate attached to said end of said second valve stem, said second backing plate having a recessed portion adjacent to its periphery to allow deflection of said second valve element so as to ensure seating of said element against said second valve seat even if said second valve stem should become skewed with respect to said second valve seat.

10. The back flow preventing device as claimed in claim 6 wherein the outer diameter of said first valve seat is different from the outer diameter of said second valve seat so as to prevent incorrect assembly of said first and second check valve assemblies in said casing.

11. The back flow preventing device as claimed in claim 1 wherein said relief valve comprises:
   (a) a first relief valve seat removably attached to the interior of said casing;
   (b) a second relief valve seat formed integrally with the interior of said casing;
   (c) a first relief valve element movable between an open position wherein said first relief valve element is displaced from said first relief valve seat and a closed position wherein said first relief valve element contacts said first relief valve seat;
   (d) a second relief valve element movable between an open position wherein said second relief valve element is displaced from said second relief valve seat and a closed position wherein said second relief valve element contacts said second relief valve seat;
   (e) a valve stem contacting said first and second relief valve elements;
   (f) means connecting said relief valve elements to said flexible diaphragm; and
   (g) biasing means to normally bias said first and second relief valves in an open position.

12. The back flow preventing device as claimed in claim 11 wherein said biasing means is a compression spring.

13. The back flow preventing device as claimed in claim 1 wherein said flexible diaphragm is formed integrally with a gasket located between said casing and said cover, said gasket having an opening therethrough which allows removal of said check valve assemblies from said casing without disturbing said flexible diaphragm.

14. The back flow preventing device as claimed in claim 1 wherein said first and second check valve assemblies are of different size so as to not be interchangeable.

15. The back flow preventing device as claimed in claim 1 further comprising means associated with said first check valve assembly to prevent incorrect attachment to said casing.

16. The back flow preventing device as claimed in claim 1 further comprising means associated with said second check valve assembly to prevent incorrect attachment to said casing.

17. The back flow preventing device as claimed in claim 1 wherein said casing has a hole therethrough allowing communication between said drain vent chamber and ambient atmosphere, said hole functioning as a drain upon closing of said drain vent opening.

* * * * *